United States Patent [19]

Flanigan

[11] 4,244,253
[45] Jan. 13, 1981

[54] CUTTING GUIDE ATTACHMENT FOR POWER TOOLS

[75] Inventor: Richard J. Flanigan, McMinnville, Tenn.

[73] Assignee: Houdaille Industries, Inc., Ft. Lauderdale, Fla.

[21] Appl. No.: 916,949

[22] Filed: Jun. 19, 1978

[51] Int. Cl.$^3$ .................. B27B 13/04; B23Q 27/00; B23D 53/06
[52] U.S. Cl. ......................... 83/411 R; 83/439; 83/802; 83/733
[58] Field of Search ............... 83/411 R, 733, 439, 83/802, 708

[56] References Cited

U.S. PATENT DOCUMENTS

| | | | |
|---|---|---|---|
| 2,157,310 | 5/1939 | Ward | 83/439 |
| 2,535,673 | 12/1950 | Forbes | 83/411 R |
| 2,720,897 | 10/1955 | Kairath | 83/439 |
| 2,766,784 | 10/1956 | Antczak | 83/439 |
| 3,764,126 | 10/1973 | Arenas | 83/411 R |
| 4,027,566 | 6/1977 | Harrill | 83/411 R |
| 4,047,458 | 9/1977 | Hall | 83/411 R |
| 4,074,600 | 2/1978 | Raphael | 83/411 R |

Primary Examiner—Donald R. Schran
Attorney, Agent, or Firm—Hill, Van Santen, Steadman, Chiara & Simpson

[57] ABSTRACT

An attachment for cutting machine tools, such as band saws, spindle-shapers, sanders and the like, controlling the feed path of the workpiece to the cutting tool to form desired workpiece contours, such as circles, arcs and the like, has a grooved track bar easily locked on and removed from the machine bed or table carrying a slide in the groove which has a workpiece centering pivot pin projecting therefrom. A workpiece is either directly pivoted on the pin or secured to a templet pivoted on the pin and is rotated about its pivot support against the cutting tool. The slide may be locked in the groove at a selected distance from the tool, may be pushed against a stop at a selected position in the groove or may be shifted by a cam to control the feed path of the workpiece for forming desired contours. Circles of selected diameters, elipses of selected minor and major radii, heart shapes, four leaf clover shapes and the like are easily developed.

8 Claims, 14 Drawing Figures

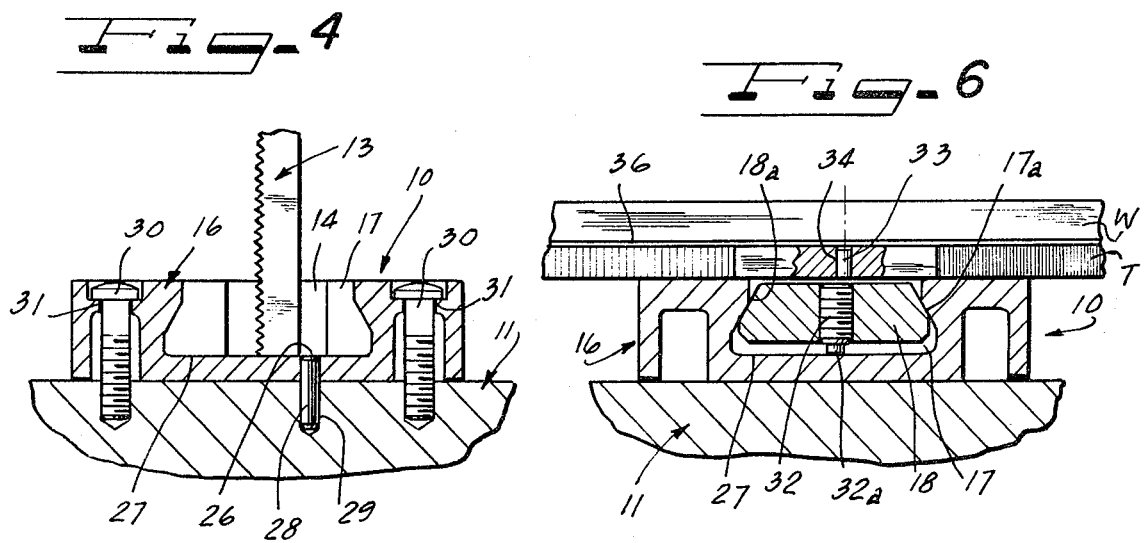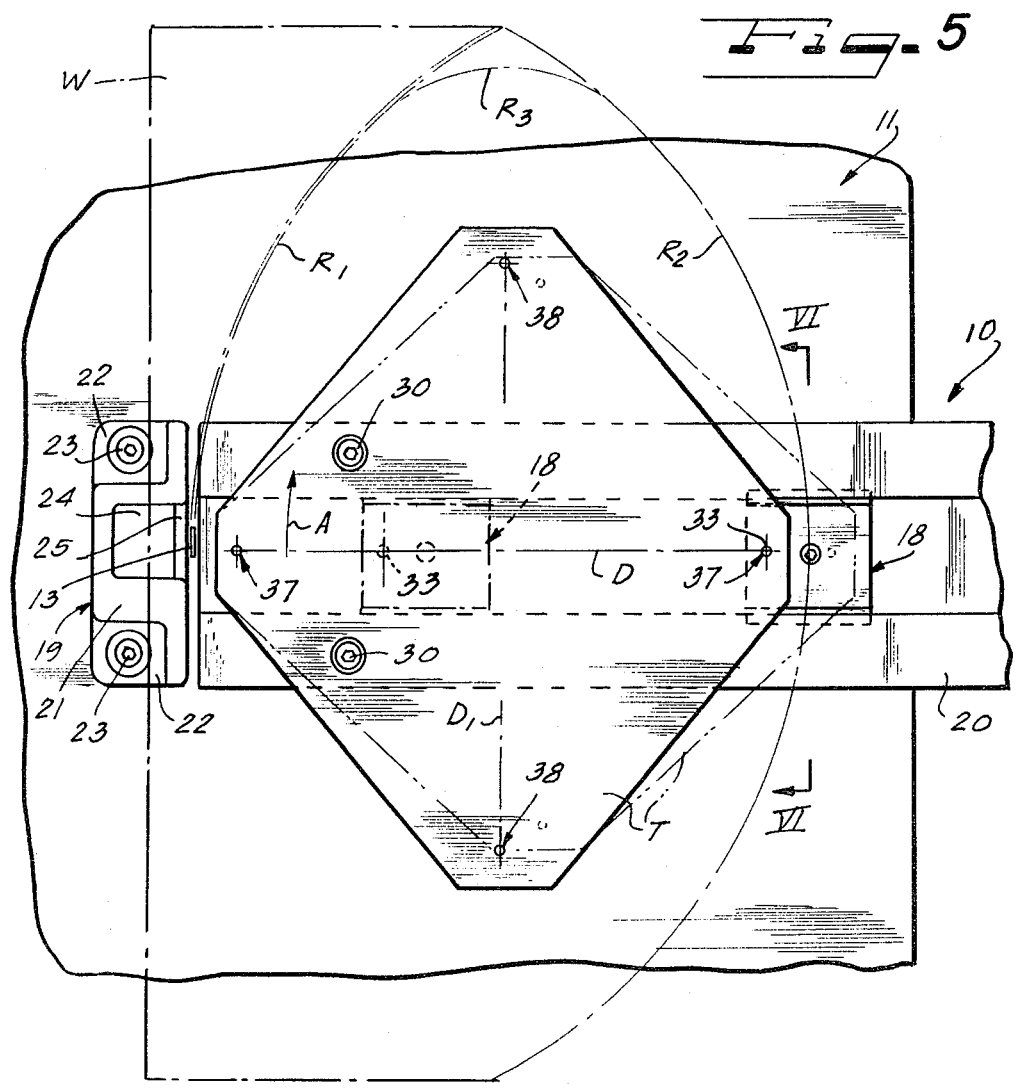

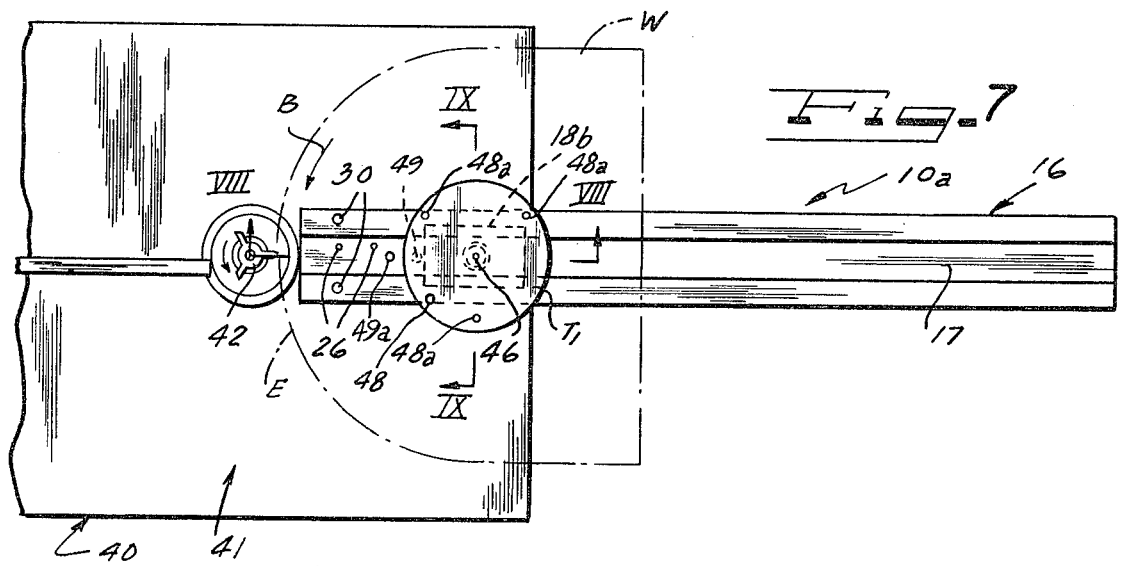
Fig. 7
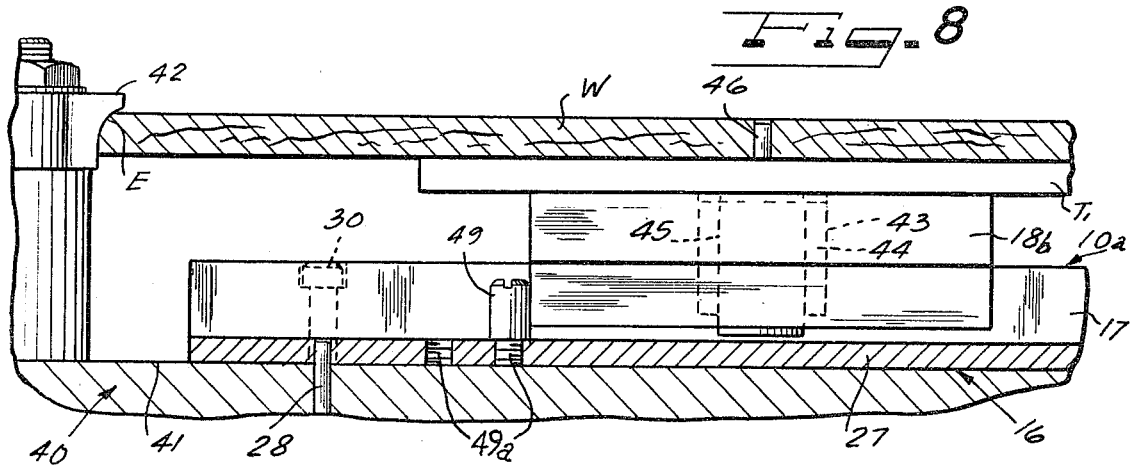
Fig. 8
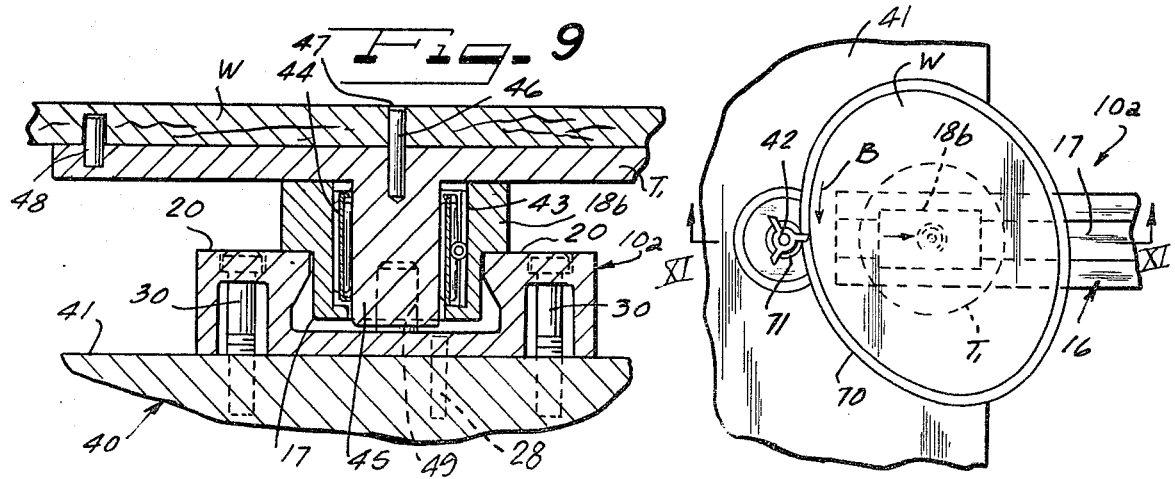
Fig. 9
Fig. 10
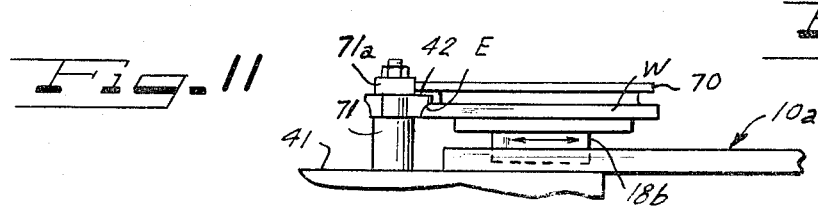
Fig. 11

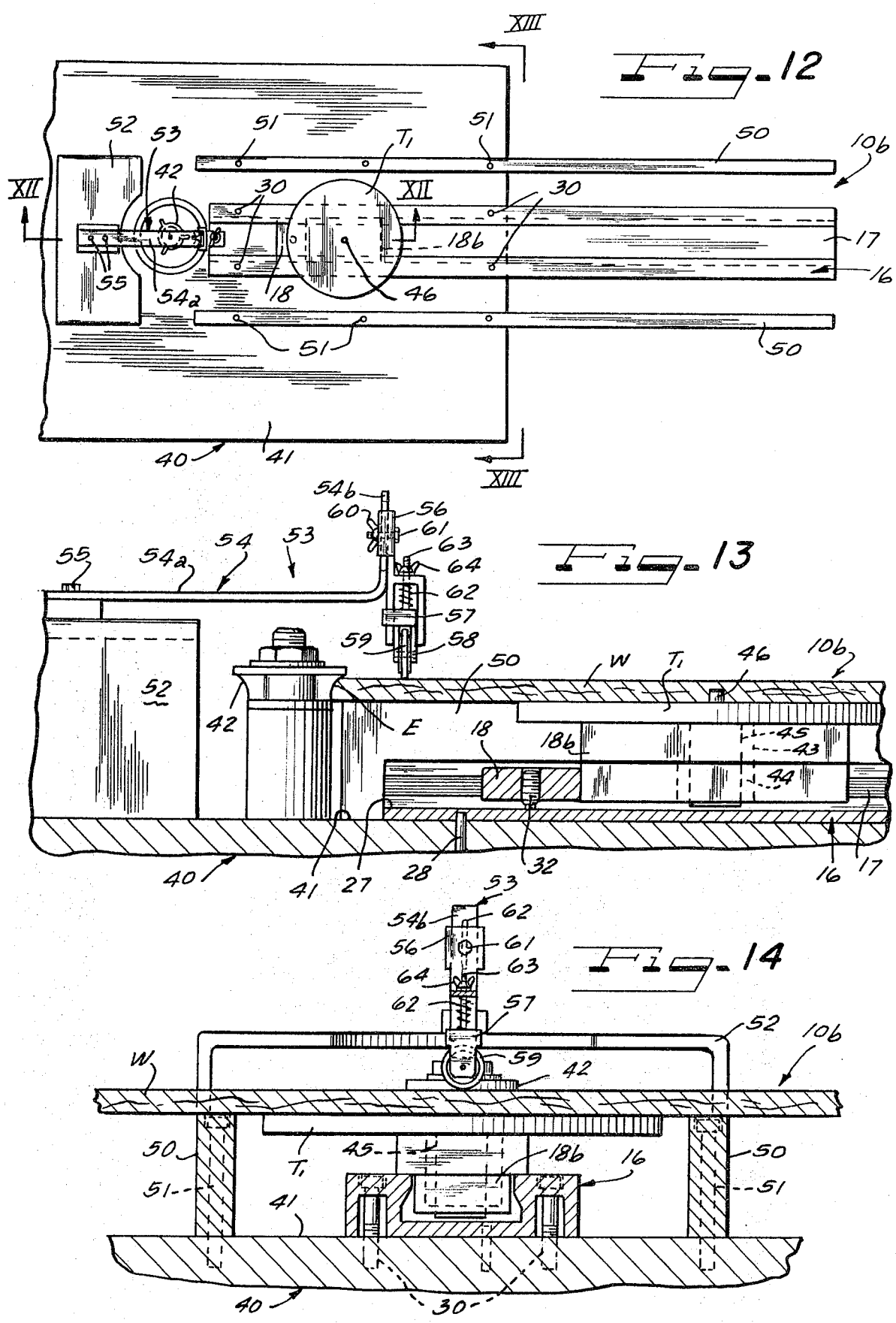

CUTTING GUIDE ATTACHMENT FOR POWER TOOLS

FIELD OF THE INVENTION

This invention relates to the art of attachments for controlling feed paths of workpieces in cutting machine tools and particularly deals with an elongated bar attachment for the bed or work table of a band saw or spindle shaper which mounts a workpiece pivot slide that is easily positioned at a selected distance from the cutting tool to control the radius of cut.

BACKGROUND OF THE INVENTION

Standard work tables for cutting tools such as band saws, spindle shapers, sanders and the like are conventionally only provided with mountings for workpiece guide fences and do not accommodate adjustable workpiece pivots controlling arcuate feed paths to the cutting tool. Drilling of pivot pin holes in such work tables or beds can, at best, only accommodate relatively short cutting radii.

SUMMARY OF THIS INVENTION

According to this invention, an elongated track bar is easily and quickly mounted at its inner end on and removed from the work table of a cutting machine tool to extend beyond the table. A slide carried by the track mounts a pivot pin which is adjustably positioned by the slide relative to the cutting edge of the tool. The pivot pin on the slide pivotally supports a workpiece or a stack of workpieces which are rotated about the pin against the cutting edge of the tool. The slide can be locked in its selected position and the workpiece is thus formed with a periphery of a desired radius. A templet can also be pivotally mounted on the slide pivot to carry a workpiece against the cutting edge of the tool in a desired arcuate path for producing elliptical, oval and other peripheral contours on the workpiece. In a band saw, the track bar is mounted on the table to extend at right angles to the outer side face of the saw band and a support for the cut-off portion of the workpiece is mounted on the table on the other side of the saw band.

In an attachment for a splindle shaper, the track bar is mounted on the work table to extend radially from the cutting edge of the shaper tool. No back-up support is needed.

A pair of dowel or rool pins are removably mounted in holes in the work table to project into holes in the inner end of the track bar for exactly aligning the track bar relative to the cutting tool. Bolts extending through bolt holes in the track bar and threaded into tapped holes in the work table then clamp the track bar to the table.

The pivot pin carrying slide can have a dovetailed sliding fit in the track bar and a set screw threaded through the slide to engage the track bar to lock the slide in fixed position.

It is then an object of this invention to provide an easily mounted removable attachment for cutting machine tools for controlling the feed path of workpieces to the cutting tool.

Another object of this invention is to provide an adjustable pivot mounting for workpieces on cutting tools.

A still further object of this invention is to provide a track bar easily mounted on the table of a power saw, shaper, sander, or the like for slidably mounting a workpiece centering pivot to control the cutting path of the workpiece to the cutting edge of the cutting tool.

A specific object of the invention is to provide a guide attachment for band saws having a track bar with a dovetail goove, a slide riding in the groove carrying an upwardly projecting workpiece receiving pivot and a locking screw for engaging the bottom of the track bar groove to wedge-lock the slide in the groove.

Other and further objects of this invention will become apparent to those skilled in this art from the following detailed description of the annexed sheets of drawings which, by way of preferred examples only, illustrate several embodiments of the invention.

ON THE DRAWINGS

FIG. 4 is an enlarged transverse cross-sectional view along the line IV—IV of FIG. 2;

FIG. 5 is a fragmentary view similar to FIG. 2 but on a larger scale, illustrating a templet mounting for the workpiece;

FIG. 6 is a fragmentary transverse sectional view with parts in elevation taken along the line VI—VI of FIG. 5;

FIG. 7 is a view similar to FIGS. 2 and 5, but illustrating the guide attachment of this invention mounted on a spindle shaper machine tool;

FIG. 8 is an enlarged longitudinal cross-sectional view taken along the line VIII—VIII of FIG. 7;

FIG. 9 is a transverse fragmentary cross-sectional view also in a larger scale, taken along the line IX—IX of FIG. 7;

FIG. 10 is a fragmentary plan view of the cutting guide attachment of this invention used with a templet on a spindle shaper machine tool;

FIG. 11 is a longitudinal sectional view, with parts in elevation, along the line XI—XI of FIG. 10;

FIG. 12 is a view similar to FIG. 7 but showing a modification having work supporting side rails and a work hold down attachment;

FIG. 13 is an enlarged longitudinal cross sectional view taken along the line XII—XII of FIG. 12;

FIG. 14 is a transverse cross sectional view, also on a larger scale, taken along the line XIII—XIII of FIG. 12.

AS SHOWN ON THE DRAWINGS

Figure 1:
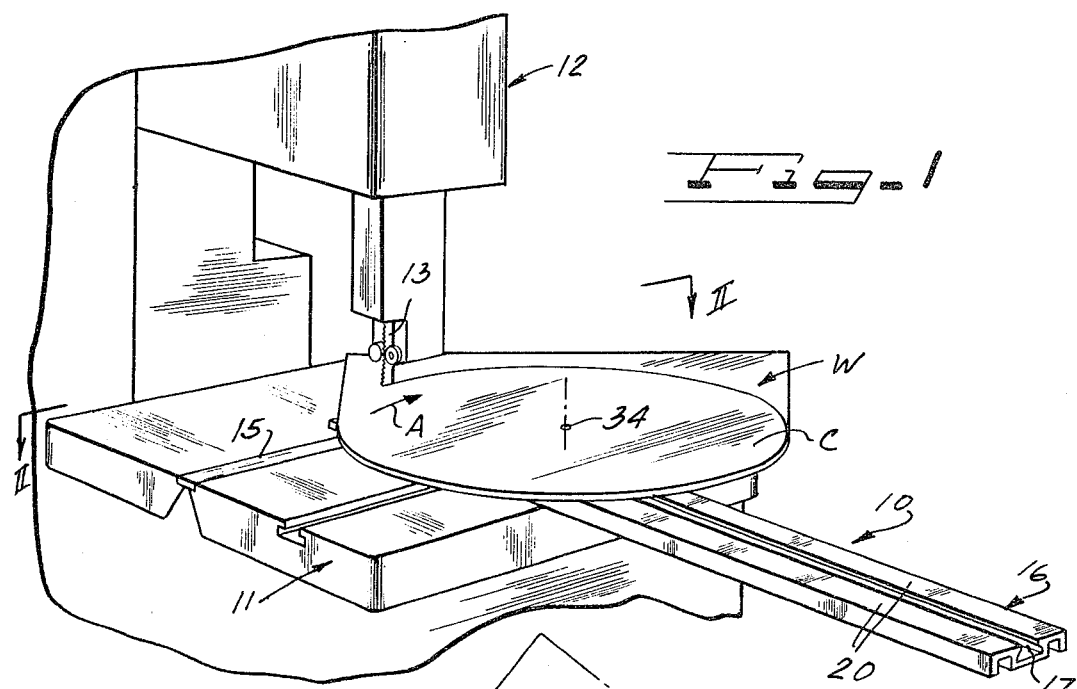
FIG. 1 is a fragmentary perspective view of a band saw equipped with the cutting guide attachment of this invention.

In FIGS. 1 to 6, the reference numeral 10 designates generally a cutting guide attachment of this invention mounted on the work table 11 of a conventional band saw 12 having a saw blade or band 13 with a cutting run extending through the slot 14 of the conventional table carried guide strip 15.

The cutting guide 10 includes an elongated track bar 16 extending across the outer side of the table 11 normal to the plane of the saw blade 13 and having a dovetail slide block 18. A support block 19 is mounted on the table 11 behind the saw band or blade 13.

Figure 3:
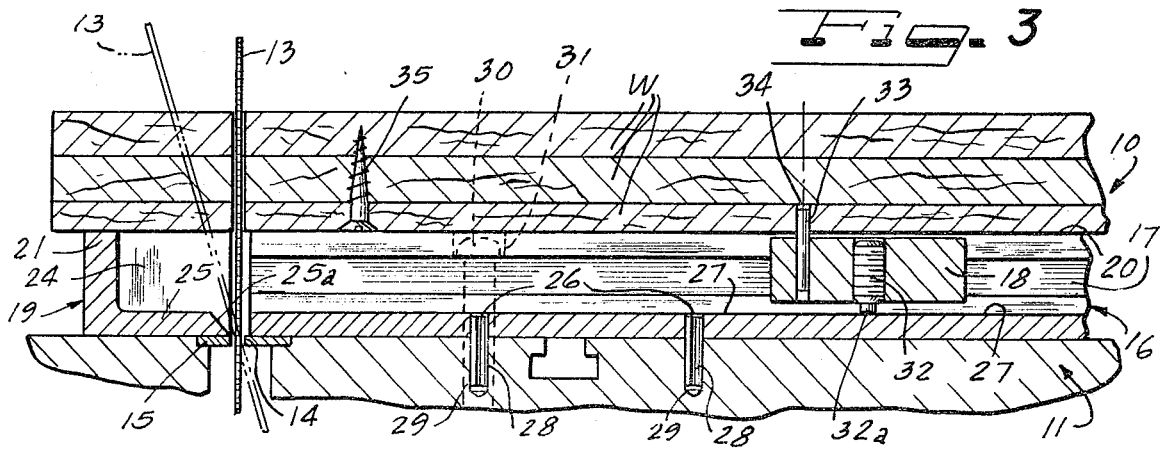
FIG. 3 is an enlarged longitudinal sectional view along the line III—III of FIG. 2.

The top faces 20 of the track bar 16, and 21 of the support 19, are flush with each other at the same level above the table 11. The support 19 at best shown in FIG. 5 has ears 22 on the bottom rear corners thereof receiving bolts 23 threaded into the table 11 for fixedly anchoring the member to the band saw table. In addition, as shown in FIGS. 3 and 5, a central open top recess 24 is provided in the support member having a bottom 25 resting on the table 11 with a beveled end 25a extending flush with the saw band slot 14. This recess 24 avoids a thick metal section to present a thin beveled end 25a which will allow a full 45° tilting of the table 11 or a tilting of the saw blade 13 to the dotted line position without binding. The track bar 16 being perpendicular to the outer or right hand side face of the saw blade 13 and spaced therefrom will not interfere with the tilting. If desired, the track bar can be made adjustable on the table 11 to extend at a selected angle to the cutting tool.

Figure 2:
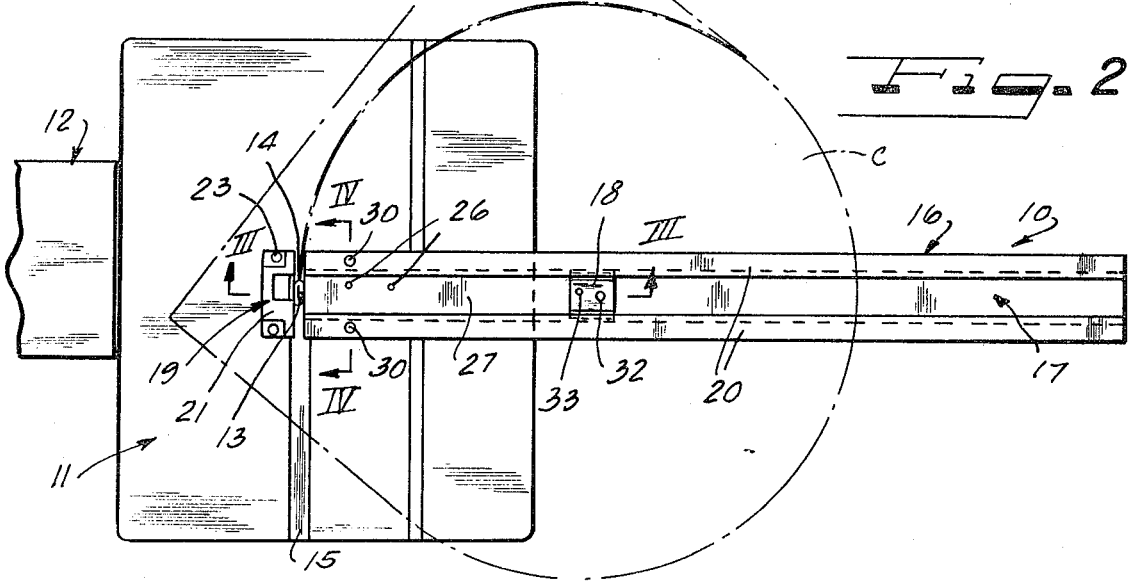
FIG. 2 is a cross-sectional view taken generally along the line II—II of FIG. 1 and showing the workpiece in dotted plan to illustrate underlying structure.

The track bar as shown in FIGS. 2, 3, and 4, has a pair of longitudinally spaced holes 26 through the floor 27 of the groove 17 thereof receiving dowel pins 28, preferably of the roll pin type anchored in holes 29 of the table 11. These holes 26 are closely adjacent the inner end of the track bar and cooperate with the pins 28 to accurately position the track bar 16 to extend laterally at right angles to the outer side face of the saw blade 13. The pins 28 seat snugly in the holes 26 and 29 to eliminate looseness or play which would permit misalignment of the track bar 16 relative to the band saw blade.

Bolts 30 are mounted in countersunk transversely aligned holes 31 of the track bar 16 on opposite sides of the groove 17 and are threaded into the table 11 to fixedly secure the track bar to the table so that it would extend laterally from the outer face of the band saw blade 13 with its top face 20 flush with the top face 21 of the support member 19.

The slide 18 has diverging side walls 18a mating with the dovetail side walls 17a of the groove 17 to have a dovetail sliding fit therewith preventing lifting of the slide out of the groove. A set screw 32 is threaded through the slide 18 with a pointed end 32a adapted to engage the floor 27 of the groove 17 as shown in FIGS. 3 and 6 to wedge the side faces 18a of the slide 18 against the side walls 17a of the groove 17 thereby locking the slide in fixed position in the groove.

The slide carries a work centering pin 33 projecting upwardly therefrom above the top face 20 of the track bar 16.

In operation, a workpiece W in the form of a sheet of plywood, metal, a flat wooden board, or the like planar sheet material to be cut by the band saw 12 has a centering hole 34 drilled partly or fully therethrough to snugly receive the centering pin 33 when the workpiece W rests on the top faces 20 of the track bar 16 and 21 of the support member 19. The hole 34 need only be drilled to a depth slightly deeper than the height of the pin 33 above the top face 20 of the bar 16 so as to present a continuous top face on the workpiece as for a table top. If desired, a stack of workpieces W can be mounted on the bottom workpiece with the drilled hole 34 and held together in fixed stack relation as, for example, by means of screws 35 shown in FIG. 3, or interposed pressure sensitive tape 36 coated on both faces thereof as shown in FIG. 6. With the workpiece stably supported on the top faces 20 of the track bar 16 and 21 of the support 19 and pivotally connected to the centering pin 33 with the slide 18 locked in fixed position in the track bar groove 17, the workpiece is rotated about the pin 33 against the teeth of the saw blade 13 in the direction of the arrow A as shown in FIG. 1 to cut a circle C from this workpiece. The radius of the circle is accurately controlled to a preselected exact measurement by positioning the slide 18 in the groove 17 so that the centering pin 33 is at exact desired radius distance from the outer side face of the saw blade 13. Then, of course, the slide 18 is locked in the groove 17 by tightening the set screw 32.

The track bar 16 may be of any desired length since it is not limited by the size of the band saw table 11. A standard length can be such as to position the centering pin 33 a maximum of three feet from the outer face of the saw blade 13 thereby making possible the cutting of a circle C having a six foot diameter.

It will also be understood that the attachment of this invention moves with the table 13 as it is tilted.

The attachment can be applied to any standard band saw table by merely drilling and tapping four holes to receive the bolts 23 and 30 and two holes to receive the dowel pins 28.

While wood workpieces have been illustrated, it will be understood that sheet metal and the like can be shaped in an identical manner with standard metal cutting saws.

It will also be understood that inside and outside radii can be cut on the workpiece.

As shown in FIG. 5, varius combinations of radii can be formed on the workpiece W by use of a templet T pivoted on the centering pin 33 and having a number of pin receiving holes 37 positioned as desired. In the illustrated templet T, holes 37 are spaced apart a distance D on one axis of the templet while holes 38 are spaced apart a greater distance D1 on an axis normal to the axis of the holes 26. Then, with the workpiece W secured on top of the templet, and the hole 37 at the right hand end of the templet mounted on the centering pin 33 with the slide 18 positioned as shown in solid line, the workpiece is swung against the saw blade 13 and a first arc of radius R1 is cut on the one side of the workpiece. Then, the templet and workpiece are reversed to position the other hole 37 on the pin 33 with the slide 18 remaining in the same position. This forms a second arc R2 of the same radius as the arc R1 and a football shape results. Then, the workpiece and templet are lifted off of the slide 18, the slide is moved forwardly to the dotted line position and a hole 38 of the templet is centered on the pin 33. Then when the workpiece is advanced to the saw blade, a short radius R3 is formed between the radii R1 and R2 providing an ellipse shape. Various positionings of the slide and selection of different holes of the templet to be centered on the pin 33 will produce a myriad of shapes on the workpiece.

As shown in FIGS. 7-11, a modified guide attachment 10a of this invention is illustrated as mounted on a splindle shaper machine tool with a flat horizontal table or bed 41 and a vertical spindle shaper tool 42 extending upwardly from the table.

The track bar 16 is aligned to extend forwardly from the shaper tool 42 by means of the dowel pins 26 and is bolted to the table 41 by the bolts 30 in the same manner as described above in connection with the band saw mounting. However, a modified slide 18b is provided to better accommodate a one-way clutch arrangement which will prevent the workpiece from kicking back as it is advanced to the cutting tool. As shown, the slide 18b rides in the track groove 17 but rests on the top faces 20 of the track bar on opposite sides of the groove. The slide projects above these top faces 20 and has a central bore 43 therethrough mounting a needle bearing one-way clutch 44. A support table T₁ has a stem 45 journaled in the clutch 44 for free rotation in one direction and being locked against rotation in the reverse direction.

A centering pin 46 on the axis of the stem 45 projects above the top face of the support table T₁ and the workpiece W has a hole 47 receiving this pin 46. The hole need only be slightly deeper than the height of the pin above the support table T₁. A templet (not shown) can be secured on top of the table T₁ if desired. The workpiece W is fixed to, or held against rotation on the support table T₁ or to a templet secured on top of the table T₁ by a pin 48 or the like and three flat head screw holes 48a are provided in table T₁ for mounting templets or workpieces.

A stop pin 49 is threaded into the bottom 27 of the track bar 16 in a selected tapped hole 49a. These holes 49a are spaced at selected distances from the shaper tool 42 to position the centering pin 46 for forming a desired radius cut on the workpiece W when the slide 18b is bottomed against a stop pin.

In operation, shown in FIG. 7 with the workpiece W centered on the pin 46 and non-rotatably secured to the support table T₁ by the pins 48 and with the stop pin 49 positioned to hold the centering pin 46 of the slide 18b a selected distance from the cutting tool 42, the workpiece W locked on the support table T₁ is rotated in the direction of the arrow B against the shaper tool 42 to cut a contoured edge E on the workpiece of the desired shape. The one-way needle bearing clutch 44 will prevent the workpiece from being reversely rotated by the action of the shaper tool 42.

As shown in FIG. 10, the support table T₁ can have a templet 70 thereon, radiating therefrom with a periphery of desired shape to be pressed against a bearing 71 underlying the shaper tool 42 and this templet 70 is pushed against the bearing 71 as the workpiece and templet are rotated whereupon the shaper will form a shaped edge E of a contour, such as an oval, controlled by the templet 70.

As shown in FIG. 11, the templet 70 can be non-rotatably fixed on top of the workpiece W to ride on a bearing 71a above the shaper tool 42.

As shown in FIGS. 12-14, a further modified guide attachment 10b is illustrated as mounted on the same type of spindle shaper machine tool 40 shown in FIGS. 7-11 and described hereinabove. The same reference numerals used in FIGS. 7-11 are used to designate the same parts in FIGS. 12-14.

The modified attachment 10b has work support rails 50,50 straddling the track bar 16 in spaced parallel relation therewith and secured upright on the table 41 by bolts 51. The rails 50 are as long as or longer than the bar 16 and have top edges flush with the top face of the table T₁, so that the workpiece on the table will rest on the rails.

The slide 18b rides in the track bar 16 in the same manner as described in the modification 10a but the stop pin 49 arrangement of the attachment 10a is replaced with a slide 18 of the same type used in the attachment 10 embodiment of FIGS. 1 to 5. This slide, however, does not have a centering pin 33 but it does have the set screw 32 to engage the floor 27 of the track bar groove 17 for locking the slide in fixed position in the groove. As shown in FIGS. 12 and 13, the slide 18 is positioned in the groove 17 ahead of the slide 18b to provide an abutment or stop for the slide 18b. The slide 18 can, of course, be easily and quickly locked in any position along the length of the groove 17 to control the extent of forward movement of the slide 18b thereby controlling the cutting radius for the workpiece W.

The shaper tool 40 has a raised guard or fence 52 on the table 41 thereof which is recessed to be spaced from the shaper spindle. According to this invention, a workpiece hold down attachment 53 is mounted on top of this member 52. The attachment 53 has a bracket 54 with one lege 54a bolted at 55 to the top of the member 52 and extending in spaced relation above the shaper spindle to an upstanding leg 54b positioned over the workpiece W. This leg 54b slidably supports a bracket 56 which in turn slidably supports a wheel or roller carriage 57 with an axle 58 rotatably carrying a roller 59 for riding on the top face of the workpiece W. The bracket 56 can be raised and lowered on the leg 54b and locked at a fixed level by a thumb screw 60 on a bolt 61 extending through a vertical slot 62 in the leg 54b.

The roller carriage 57 is biased toward the workpiece W by a spring 62 surrounding a pin 63 secured to the carriage 57 and threaded in a wing nut 64 suspending the pin from the bracket 56. The wing nut 64 may first be tightened to compress the spring 62 to a desired load. Then the bracket 56 may be lowered to engage the roller 59 with the workpiece. Next the wing nut 60 is tightened to lock the bracket on the leg 54b and the wing nut 64 is loosened to apply the desired spring load to the roller.

The roller 59 rides freely on the workpiece W and being spring biased downwardly against the workpiece, it is effective to prevent a raising of the workpiece off of the rails 50. In this manner, the workpiece is seated firmly on the rail as it is rotated about the centering pin 46 of the table T₁.

From the above descriptions, it will, therefore, be understood that this invention provides an easily mounted attachment for cutting tools such as band saws, shapers and the like which will guide the workpiece along a feed path to the cutter tool to control the contour of the workpiece.

I claim as my invention:

1. A cutting guide attachment for work table equipped cutting machine tools controlling the feed path of the workpiece to the cutting tool to form desired workpiece contours which comprises, an elongated track bar, bolts for demountably securing one end of the track bar on top of the machine tool work table positioning the bar adjacent one side of the cutting tool to extend laterally from the cutting edge of the tool, a slide carried by said track bar, a workpiece centering means on said slide adapted to guide the workpiece against the cutting tool along an arcuate path with a radius controlled by the distance of said centering means from the cutting tool, means controlling the position of said slide in said track bar to maintain the desired feed path, and a workpiece supporting block mounted on top of said work table adjacent the opposite side of the cutting tool presenting a work support surface at the same level as the workpiece centered on the centering means.

2. The cutting guide attachment of claim 1 wherein the track bar has a longitudinal groove along the length thereof with flat surfaces on both sides of the groove level with the workpiece support block, and the slide rides in said groove.

3. The cutting guide attachment of claim 1 wherein the track bar when mounted on the table by said bolts extends beyond the table without additional support.

4. The cutting edge attachment of claim 1 wherein the elongated track bar has an open top dovetail groove along the length thereof, the slide has tapered sides fitting the dovetail groove, and a locking screw is threaded through the slide to engage the bottom of the groove for wedge-locking the sides of the slide with the sides of the groove.

5. A circle cutting guide for band saws having a work table with a band saw blade having a driving run through said table which comprises, an elongated track bar having a dovetail groove along the length thereof, workpiece support faces on said bar on opposite sides of said groove, a workpiece support member having a top support face to cooperate with the faces of said track bar, means securing said work support member on a band saw table adjacent the inner side face of the upright cutting run of the saw blade, means securing the track bar on the band saw table on the opposite side of the band saw blade, means on the table aligning the track bar to extend normal to and spaced from the outer face of the band saw blade, a dovetail slide block riding in said dovetail groove of the track bar, a centering pin projecting from said slide block above the support faces of the track bar, a set screw threaded through said slide block having an end for engaging the bottom of the dovetail groove of said track bar to wedge lock the sides of the slide block against the side walls of the dovetail groove, said top faces of said track bar and said support member lying in the same horizontal plane to carry a workpiece flatwise above the table, and said centering pin providing an axis of rotation for the workpiece to control the feed path of the workpiece to the saw blade thereby controlling the contour of the saw cut.

6. The circle cutting guide of claim 3 wherein the track bar projects beyond the table and the projected end is unsupported and free to receive a workpiece thereover.

7. The circle cutting guide of claim 3 wherein the work support member is a block and a pair of bolts threaded in the work table secure the block to the table.

8. The circle cutting guide of claim 3 including fasteners for securing together a stack of workpieces on the top faces of the track bar and workpiece support.

* * * * *